US010949195B2

(12) United States Patent
Just

(10) Patent No.: US 10,949,195 B2
(45) Date of Patent: Mar. 16, 2021

(54) METHOD FOR CHANGING OVER TO A FIRMWARE VERSION IN AN ELECTRICAL CONTROL UNIT FOR A DRIVE SYSTEM, ELECTRICAL CONTROL UNIT AND DRIVE SYSTEM

(71) Applicant: Lenze Automation GmbH, Aerzen (DE)

(72) Inventor: Nikolai Just, Lemgo (DE)

(73) Assignee: Lenze Automation GmbH, Aerzen (DE)

( * ) Notice: Subject to any disclaimer, the term of this patent is extended or adjusted under 35 U.S.C. 154(b) by 0 days.

(21) Appl. No.: 16/114,564

(22) Filed: Aug. 28, 2018

(65) Prior Publication Data

US 2019/0065176 A1 Feb. 28, 2019

(30) Foreign Application Priority Data

Aug. 29, 2017 (DE) ...................... 10 2017 215 044.0

(51) Int. Cl.
*G06F 8/654* (2018.01)
*G06F 9/455* (2018.01)

(52) U.S. Cl.
CPC .......... *G06F 8/654* (2018.02); *G06F 9/45512* (2013.01)

(58) Field of Classification Search
CPC ..................................................... G06F 8/654
USPC ......................................................... 717/170
See application file for complete search history.

(56) References Cited

U.S. PATENT DOCUMENTS

| 10,331,428 | B1* | 6/2019 | Zalpuri .................... G06F 8/65 |
| 10,430,263 | B2* | 10/2019 | Polar Seminario .......................... G06F 11/1441 |
| 2004/0074148 | A1* | 4/2004 | Her ........................ E05B 83/40 49/324 |
| 2005/0055429 | A1 | 3/2005 | Abele et al. |
| 2010/0169876 | A1* | 7/2010 | Mann ........................ G06F 8/65 717/170 |
| 2011/0239208 | A1* | 9/2011 | Jung ......................... G06F 8/65 717/170 |
| 2013/0297928 | A1 | 11/2013 | Wyss et al. |
| 2014/0344799 | A1* | 11/2014 | Thodati ................... G06F 8/654 717/171 |
| 2015/0347124 | A1* | 12/2015 | Sotani ..................... G06F 8/654 717/170 |

(Continued)

FOREIGN PATENT DOCUMENTS

| DE | 10 2010 064 279 A1 | 6/2012 |
| DE | 10 2008 016 302 B4 | 6/2013 |
| DE | 10 2012 205 709 A1 | 10/2013 |

(Continued)

*Primary Examiner* — Qing Chen
*Assistant Examiner* — Clint Thatcher
(74) *Attorney, Agent, or Firm* — Crowell & Moring LLP

(57) ABSTRACT

A method for changing over to a firmware version in an electrical control unit for a drive system, wherein the electrical control unit is suitable for executing an existing application program for operating the drive system, and a different firmware version is in operation in the electrical control unit. The method a) checks the existing application program for compatibility with the one firmware version by use of a script, and b) in the case where the existing application program is compatible with the one firmware version, changes over from the other firmware version to the one firmware version in the electrical control unit.

9 Claims, 1 Drawing Sheet

(56) References Cited

U.S. PATENT DOCUMENTS

2018/0365423 A1* 12/2018 Poppe .................... G05B 19/00

FOREIGN PATENT DOCUMENTS

| EP | 1 416 400 B1 | 3/2008 |
| EP | 3 001 310 A1 | 3/2016 |

* cited by examiner

METHOD FOR CHANGING OVER TO A FIRMWARE VERSION IN AN ELECTRICAL CONTROL UNIT FOR A DRIVE SYSTEM, ELECTRICAL CONTROL UNIT AND DRIVE SYSTEM

CROSS REFERENCE TO RELATED APPLICATION

This application claims priority under 35 U.S.C. § 119 from German Patent Application No. DE10,2017/215044.0, filed Aug. 29, 2017, the entire disclosure of which is herein expressly incorporated by reference.

BACKGROUND AND SUMMARY OF THE INVENTION

The invention relates to a method for changing over to a firmware version in an electrical control unit for a drive system, to an electrical control unit, and to a drive system with an electrical control unit.

A method for changing over to a firmware version in an electrical control unit for a drive system, an electrical control unit, and a drive system with an electrical control unit are known.

The object underlying the invention is the provision of a method for changing over to a firmware version in an electrical control unit for a drive system, said method reducing or even entirely avoiding problems when changing over, and/or being relatively user-friendly. Moreover, the object underlying the invention encompasses the provision of an electrical control unit for executing the method, and of a drive system with an electrical control unit for executing the method.

The invention achieves this object through the provision of a method for changing over to a firmware version in an electrical control unit for a drive system, wherein the electrical control unit is suitable for executing an existing application program for operating the drive system, and a different firmware version is in operation in the electrical control unit. The method includes the following steps: a) checking the existing application program for compatibility with the one firmware version by way of a script, and b) in the case where the existing application program is compatible with the one firmware version, changing over from the other firmware version to the one firmware version in the electrical control unit.

Moreover, the object of the invention is achieved by an electrical control unit designed for executing the method, and by a drive system having an electrical control unit and an actuator, in particular an electric motor, the electrical control unit having been assigned to the actuator for the purpose of controlling the actuator, wherein the drive system has been designed for executing the method.

Advantageous further developments and/or configurations of the invention are described and claimed herein.

The method, in particular an automatic method, according to the invention for changing over or changing to a firmware version in an electrical control unit is suitable for a drive system, in particular an electrical drive system. The electrical control unit is suitable for executing an existing application program for operating the drive system, in particular generally. In the electrical control unit a different firmware version is in operation. The method features the following steps: a) checking—in particular, automatic checking—of the existing application program for compatibility with the one firmware version by use of a script; b) in the case where or if the existing application program is compatible with the one firmware version, changing over—in particular, automatic changing over—or changing from the other firmware version to the one firmware version in the electrical control unit.

Firmware may typically be software which may have been embedded in the electrical control unit. The firmware may, for instance, have been stored in a flash memory, in an EPROM, EEPROM or ROM of the electrical control unit, and may not be capable of being changed over or exchanged by a user, or may be capable of being changed over or exchanged by a user only using special means or functions. The term "firmware" is due to the fact that the firmware may have been firmly connected functionally to the hardware, in particular of the electrical control unit. The firmware may typically occupy an intermediate position between an item of hardware of the electrical control unit and the application program which, where appropriate, may be capable of being changed over or exchanged relatively easily.

The change-over from the other firmware version to the one firmware version may be useful if errors of the other firmware version can be eliminated or new functions can be retrofitted with the one firmware version. The one firmware version may be higher or newer than the other or old firmware version. In this case, the change-over may be designated as an upgrade or update. However, the existing application program may not be compatible with the one firmware version. Then a change-over from the other firmware version to the one firmware version should not take place. In particular, the existing application program may be based on the other firmware version.

Additionally or alternatively, the change-over from the other firmware version to the one firmware version may be useful if the existing application program is not compatible with the other firmware version. In particular, the other firmware version may be higher or newer than the one or old firmware version. In this case, the change-over may be designated as a downgrade. For instance, the electrical control unit may be a replacement control unit which may have been delivered with the other or latest firmware version. In particular, the existing application program may be based on the one or old firmware version.

The method enables problems when changing over to be reduced or even to be entirely avoided. Consequently the method is relatively user-friendly.

In particular, with and/or after the change-over the one firmware version may be in operation in the electrical control unit, in particular instead of the other firmware version. Additionally, the other firmware version may be, or may have been, erased or removed from the electrical control unit, in particular after the initial operation of the one firmware version.

Moreover, with and/or after the change-over to the one firmware version in the electrical control unit the latter may have been designed for executing the existing application program for operating the drive system. In particular, the electrical control unit may exhibit a microprocessor and/or a field-programmable gate array (FPGA) for executing the existing application program.

The existing application program may be designated as application software, application—in particular, customer application—or control program. The application program may be application-specific or application-individualized or customer-specific. In particular, the application program may be a PLC-based program (PLC: programmable logic controller).

The script may have been designed to read out a version and/or another item of metainformation of the existing application program, and/or the application program itself, at least partially, and on the basis thereof to check the compatibility. In other words: in the script there may have been recorded which firmware version may be or is compatible with which application-program version.

The existing application program may be present or may have been stored on or in the electrical control unit, in particular on a removable storage medium such as an SD card in the control unit. Additionally or alternatively, the existing application program may be present in a programmable logic controller (PLC) which may be in data communication with the electrical control unit.

In addition, the electrical control unit may be an integral part of the drive system. Additionally or alternatively, the drive system may be an integral part of a plant, in particular a production plant.

In the case where the existing application program is not compatible with the one firmware version, a compatibility-problem message can be output, in particular to the user.

Step b) may be executed synchronously with step a) and/or temporally after the latter.

In a further development of the invention, in step a) the script is executed in the electrical control unit, in particular automatically. The execution can be triggered from a maintenance PC or engineering PC, in particular by the user, in which case the maintenance PC may be in data communication with the electrical control unit.

In a further development of the invention, the method features the following step: changing over to the script, in a script version that has been assigned to the one firmware version, from a different script in a different script version that has been assigned to the other firmware version. Step a) features: checking—in particular, automatic checking—by use of the script in the one script version. In particular, the other script version may be present in the electrical control unit. Additionally, the other script version may be, or may have been, erased from the electrical control unit. The one script version may correspond to the one firmware version, or these may be identical versions. The other script version may correspond to the other firmware version.

In a further development of the invention, the script is present in a script version corresponding to the one firmware version, or in a higher script version. This makes it possible that the script may know the one firmware version, or an item of information—in particular, an item of compatibility information—about the one firmware version may have been recorded in the script. Additionally, the script may know the other firmware version, or an item of information—in particular, an item of compatibility information—about the other firmware version may have been recorded in the script. In particular, the one firmware version may be higher than the other firmware version.

In a further development of the invention, the one firmware version and the other firmware version are different from one another or variable in a number of partitions and/or in a size of one of the number of partitions and/or in a right of access of one of the number of partitions and/or in a content of one of the number of partitions. In particular, the script may have been designed to recognize a diversity or a difference between the firmware versions, in particular by at least partial readout of the number of partitions, and to check whether the difference of the one firmware version in relation to the other firmware version may or will cause a compatibility problem with the existing application program, or whether the difference may be or will be or is irrelevant for the—in particular, problem-free—execution of the existing application program.

In a further development of the invention, the method features the following step: provision—in particular, automatic provision—of a packet version. The one packet version exhibits the script and the one firmware version. Step a) features: checking—in particular, automatic checking—by use of the script that has been provided. Consequently, everything required or needed for the change-over may be, or may have been, provided all at once. This can make it possible that the user does not need to look for or select the script relating to the firmware version. The one packet version may be, or may have been, provided on a server, in a cloud and/or on a maintenance PC. In particular, the script may be in a script version that may correspond to the one firmware version.

In one configuration of the invention, the method features the following step: transferring the one packet version to the electrical control unit. Step a) features: checking—in particular, automatic checking—by use of the transferred script. Consequently the packet version is provided in the electrical control unit. In particular, this can make it possible that transfer to the control unit needs to occur only a single time. Formulated differently: the script and the one firmware version do not need to be transferred to the control unit separately from one another. The one packet version can be transferred from a server, from a cloud and/or from a maintenance PC and/or from a removable storage medium.

In a further development of the invention, step a) features: checking—in particular, automatic checking—of the electrical control unit for compatibility with the one firmware version by use of the script. Step b) features: in the case where or if the electrical control unit is compatible with the one firmware version, changing over—in particular, automatic changing over—from the other firmware version to the one firmware version in the electrical control unit. In particular, the script may have been designed to read out a version and/or another item of metainformation of the electrical control unit or its hardware, and to check the compatibility on the basis thereof. In other words: in the script there may have been recorded which firmware version may be or is compatible with which control unit and/or with which control-unit version. In the case where the electrical control unit is not compatible with the one firmware version, a compatibility-problem message can be output, in particular to the user.

In a further development of the invention, the electrical control unit is a frequency converter, a servo converter, a motion controller or a visu controller. Typically, motion controllers are electrical control units for regulating or controlling motion, by means of which a pose, a speed, an acceleration or a combination thereof can be influenced. A typical application is, for instance, point-to-point position regulation and speed regulation. Typically, visu controllers are electrical control units that may have been designed for IPC visualization.

Moreover, the invention relates to an electrical control unit. The electrical control unit according to the invention has been designed for the execution—in particular, for the automatic execution—of the method previously described.

The electrical control unit may make possible the same advantages as the method previously described. In particular, the electrical control unit may have been entirely or partially designed as in respect of the method previously described.

In addition, the invention relates to a drive system, in particular an electrical drive system. The drive system according to the invention exhibits an electrical control unit and an actuator, in particular an electric motor. The electrical control unit has been assigned to the actuator for the purpose of controlling the actuator. The drive system has been designed for the execution—in particular, for the automatic execution—of the method previously described.

The drive system can make possible the same advantages as the method previously described. In particular, the electrical control unit may have been entirely or partially designed as in respect of the method previously described. The drive system may have been entirely or partially designed as in respect of the method previously described.

Additionally, the drive system may exhibit a sensor. The control unit and additionally the actuator may have been assigned to the sensor. In particular, the control unit may have been designed to control the actuator in a manner depending on a sensor signal of the sensor.

Further advantages and aspects of the invention result from the claims and from the following description of preferred embodiments of the invention, which are elucidated in the following on the basis of the figures.

DETAILED DESCRIPTION OF THE DRAWINGS

Figure 1:
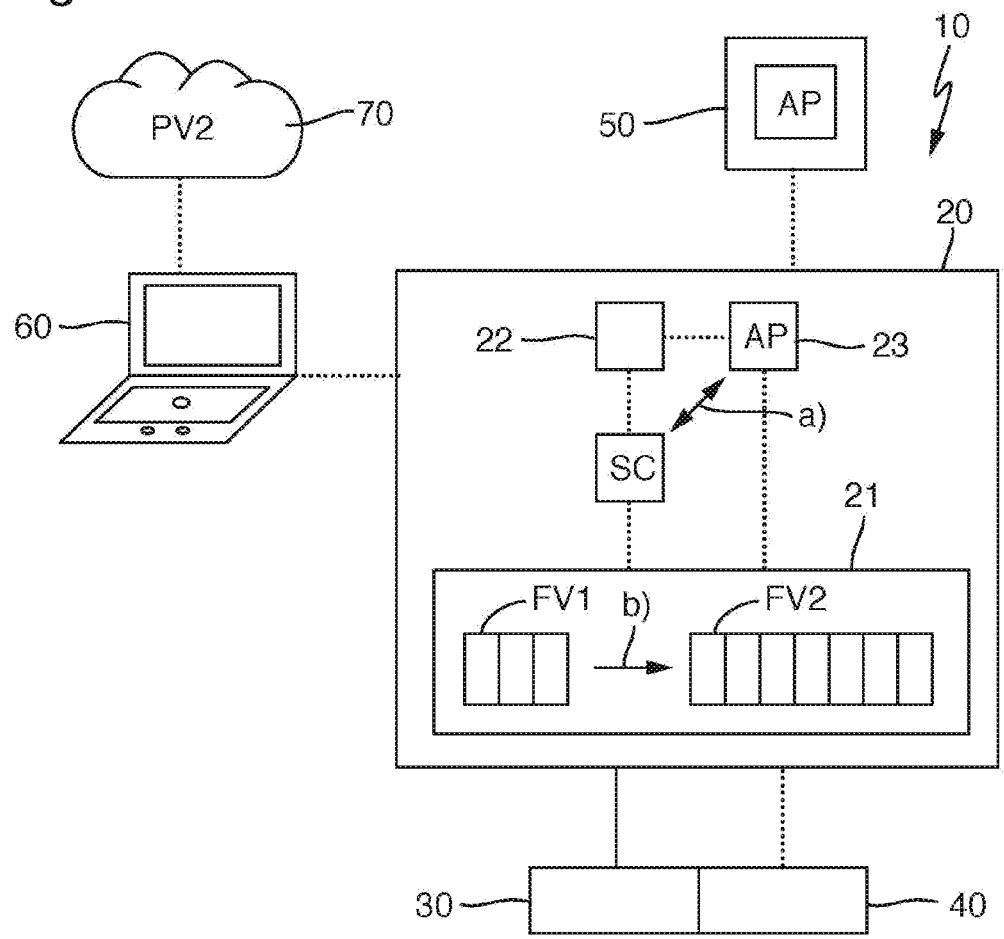
FIG. 1 is a schematic diagram of a drive system according to the invention with an electrical control unit according to the invention in the course of executing a method according to the invention.

FIG. 1 shows a drive system 10—in particular, an electrical drive system—according to the invention. The drive system 10 has an electrical control unit 20 according to the invention and an actuator 30 in the form of an electric motor. The electrical control unit 20 has been assigned to the actuator 30 for the purpose of controlling the actuator 30. In detail, the control unit 20 is electrically connected to the actuator 30, as indicated in FIG. 1 by a continuous line.

In the embodiment shown, the electrical control unit 20 is a frequency converter. In alternative embodiments, the control unit may be a servo converter, a motion controller or a visu controller.

Additionally, the drive system 10 has a sensor 40. The electrical control unit 20 and additionally the actuator 30 have been assigned to the sensor 40. The control unit 20 has been designed to control the actuator 30 in a manner depending on a sensor signal, which is not represented, of the sensor 40. In detail, the control unit 20 is in signal communication with the sensor 40, as indicated in FIG. 1 by a dotted line.

In alternative embodiments, the drive system may exhibit more than the one electrical control unit, in particular at least two, in particular at least five, in particular at least ten. Moreover, in alternative embodiments the drive system may exhibit more than the one actuator, in particular at least two, in particular at least five, in particular at least ten. In addition, in alternative embodiments the drive system may exhibit more than the one sensor, in particular at least two, in particular at least five, in particular at least ten. More than the one actuator may have been assigned to the control unit, for instance for the case of so-called two-axis or multi-axial applications. Furthermore, more than the one sensor may have been assigned to the control unit.

In addition, in the embodiment that is shown the drive system 10 has a PLC 50 which is in data communication with the electrical control unit 20, for instance via EtherCAT, as indicated in FIG. 1 by a dotted line.

Moreover, in the embodiment that is shown the drive system 10 has a maintenance PC 60 which is in data communication with the control unit 20, in particular for a change-over to a firmware version FV2 in the control unit 20. Before and/or after the change-over, the maintenance PC does not need to be in data communication with the control unit.

Before the change-over, a different firmware version FV1 has been stored in the control unit 20, in particular in a memory 21 in the form of a flash memory of the control unit 20. In particular, before the change-over the other firmware version FV1 is in operation in the control unit 20.

In addition, the electrical control unit 20 is suitable for executing an existing application program AP in the form of a PLC-based program for operating the drive system 10. In detail, the control unit 20 includes a microprocessor and/or a FPGA 22 for executing the application program AP. In the embodiment shown, the application program AP has been stored in the control unit 20, in particular on a removable storage medium 23 in the form of an SD card in the control unit 20. Additionally, the application program AP has been stored in the PLC 50. In alternative embodiments, it may be sufficient if the application program can be or has been stored either in the control unit or in the PLC.

A method according to the invention for changing over to the one firmware version FV2 in the electrical control unit 20 for the drive system 10, said electrical control unit 20 being suitable for executing the existing application program AP for operating the drive system 10, and the other firmware version FV1 being in operation in the electrical control unit 20, features the following steps: a) checking the existing application program AP for compatibility with the one firmware version FV2 by use of a script SC; b) in the case where the existing application program AP is compatible with the one firmware version FV2, changing over from the other firmware version FV1 to the one firmware version FV2 in the electrical control unit 20.

The drive system 10 or its electrical control unit 20 has been designed for executing the method.

Additionally, step a) features: checking the electrical control unit 20 for compatibility with the one firmware version FV2 by use of script SC. Step b) features: in the case where the control unit 20 is compatible with the one firmware version FV2, changing over from the other firmware version FV1 to the one firmware version FV2 in the control unit 20.

In the embodiment shown, the application program AP and the control unit 20 are compatible with the one firmware version FV2. A change-over occurs from the other firmware version FV1 to the one firmware version FV2 in the control unit 20. After the change-over, the one firmware version FV2 is in operation in the control unit 20, and the latter has been designed for executing the application program AP for operating the drive system 10. In the case where the application program or the control unit were not compatible with the one firmware version, a compatibility-problem message would be output, in particular by means of the maintenance PC.

Figure 2:
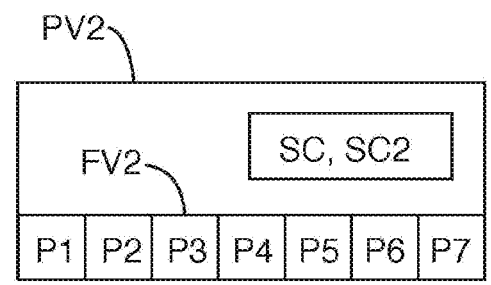
FIG. 2 illustrates a packet version with a script and with a firmware version.

In detail, the method features the following step: provision of a packet version PV2 as shown in FIG. 2. The one packet version PV2 has script SC and the one firmware version FV2. Step a) features: checking by use of the provided script SC. In particular, the method features the following step: transferring the one packet version PV2 to the electrical control unit 20. Step a) features: checking by use of the transferred script SC.

In the embodiment shown, the one packet version PV2 is or has been provided on a server 70 which is in data communication with the maintenance PC 60. The one packet version PV2 is transferred from the server 70 to the maintenance PC 60. Before and/or after the transfer, the maintenance PC does not need to be in data communication with the server. Consequently the one packet version PV2 is provided on the maintenance PC 60. The one packet version PV2 is transferred from the maintenance PC 60 to the electrical control unit 20. Consequently the one packet version PV2 is provided in the electrical control unit 20. In detail, the one packet version PV2 or its firmware version FV2 is transferred in packet form or as a binary packet to the electrical control unit 20.

Furthermore, the method features the following step: changing over to script SC, in a script version SC2 which has been assigned to the one firmware version FV2, from a different script SCA in a different script version SC1 which has been assigned to the other firmware version FV1. Step a) features: checking by use of script SC in the one script version SC2.

Figure 3:
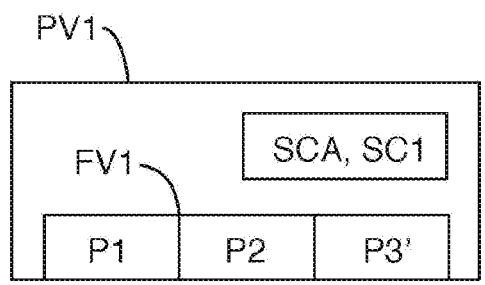
FIG. 3 illustrates a different packet version with a different script and with a different firmware version.

In the embodiment shown, before the transfer of the one packet version PV2 a different packet version PV1, which exhibits the other script SCA in the other script version SC1 and the other firmware version FV1, as shown in FIG. 3, was in the electrical control unit 20. With the change-over to script SC in the one script version SC2, the other script SCA in script version SC1 is erased from the electrical control unit 20.

In detail, the one script version SC2 corresponds to the one firmware version FV2. The other script version SC1 corresponds to the other firmware version FV1.

The one firmware version FV2 and the other firmware version FV1 are different from one another in a number of partitions P1, P2, P3, P4, P5, P6, P7, P3' and in a content of one of the number of partitions P3, P4, P5, P6, P7, P3', as can be discerned in FIGS. 2 and 3. In alternative embodiments, the one firmware version and the other firmware version may be different from one another in the number of partitions, in a size of one of the number of partitions, in a right of access of one of the number of partitions and/or in the content of one of the number of partitions.

In the embodiment shown, the other firmware version FV1 exhibits three partitions P1, P2, P3', for instance SPL, rescue system and/or productive system. The one firmware version exhibits seven partitions P1, P2, P3, P4, P5, P6, P7, for instance SPL, rescue system, productive kernel, productive RFS, FPGA, system and/or data. In alternative embodiments, the one firmware version and/or the other firmware version may each have a single, two, three, four, five, six, seven, eight, nine, ten or more than ten partitions.

In addition, in the embodiment that is shown the one firmware version FV2 is higher than the other firmware version FV1. The existing application program AP is based on the other firmware version FV1. In alternative embodiments, the other firmware version may be higher than the one firmware version. In particular, the existing application program may be based on the one firmware version.

Moreover, in step a) script SC is executed in the electrical control unit 20. In the embodiment shown, the execution is triggered from the maintenance PC 60.

In detail, script SC checks, in particular at first, whether sufficient memory capacity is available for the one firmware version FV2 in addition to the other firmware version FV1 in the electrical control unit 20 or in its memory 21. This is the case in the embodiment shown, since the memory 21—or, to be more exact, its memory capacity—has been chosen in such a manner that said memory or said memory capacity is sufficient for distinctly more than the two firmware versions. In particular after this, script SC checks the electrical control unit 20 and, in particular finally, the existing application program AP for compatibility with the one firmware version FV2.

In detail, in step b) the one firmware version FV2 does not necessarily need to be written as a whole to the memory 21. It may be sufficient to write only some of the partitions of firmware version FV2 to the memory 21, namely those partitions in which the one firmware version FV2 and the other firmware version FV1 are different from one another. Unchanged partitions of the other firmware version FV1 may continue to exist and do not, in particular, need to be overwritten. In the embodiment shown, partitions P1, P2 are unchanged. Partitions P3, P4, P5, P6, P7 are newly written to the memory 21. In this case, partition P3' continues to exist in the memory 21 for the present.

In addition, individual partitions are renamed, in particular only after completion of all write operations. Consequently, in the case where an error arises during writing, for instance an interruption of a current supply of the electrical control unit 20, a risk that the control unit 20 may or will become unusable can be reduced or even avoided. The renaming occurs atomically—that is to say, either all the partitions to be renamed are renamed or none are. Consequently an inconsistent status between the two firmware versions can be ruled out.

Furthermore, the other firmware version FV1 is not erased as a whole from the memory 21. It may be sufficient to erase only the partitions that are no longer needed. In the embodiment shown, partition P3' is erased.

In addition, a restart of the electrical control unit 20 occurs, with booting taking place from the one firmware version FV2.

In the case where the change-over was successful, a success message can be output, in particular by means of the maintenance PC 60.

As the embodiments shown and elucidated above make clear, the invention provides an advantageous method for changing over to a firmware version in an electrical control unit for a drive system, said method reducing or even entirely avoiding problems when changing over, and/or being relatively user-friendly. The invention also provides an electrical control unit for executing the method, and a drive system with an electrical control unit for executing the method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for changing over to a second firmware version in an electrical control unit for a drive system, wherein the electrical control unit is suitable for executing an existing application program for operating the drive system, and a different, first firmware version is in operation in the electrical control unit, the method comprising the steps of:
- a) checking the existing application program for compatibility with the second firmware version by way of a script; and
- b) in a case where the existing application program is compatible with the second firmware version, changing over from the first firmware version to the second firmware version in the electrical control unit, wherein the second firmware version then occupies an intermediate position between hardware of the electrical control unit and the existing application program, wherein the method further comprises the steps of:

changing over to the script, in one script version that has been assigned to the second firmware version, from a different script in a different script version that has been assigned to the first firmware version, and wherein step a) carries out the checking by use of the script in the one script version, wherein the script is in a script version corresponding to the second firmware version or higher, and wherein the script is designed to read out the application program itself, at least partially, and on the basis thereof to check the compatibility.

2. The method as claimed in claim 1, wherein
in step a), the script is executed in the electrical control unit.

3. The method as claimed in claim 1, wherein
the second firmware version and the first firmware version are different from one another in one or more of: (i) a number of partitions, (ii) a size of one of the number of partitions, (iii) a right of access of one of the number of partitions, and (iv) a content of one of the number of partitions.

4. The method as claimed in claim 1, further comprising the step of:
providing one packet version, said one packet version exhibiting the script and the second firmware version,
wherein step a) carries out the checking by use of the provided script.

5. The method as claimed in claim 4, further comprising the step of:
transferring the one packet version to the electrical control unit,
wherein step a) carries out the checking by use of the transferred script.

6. The method as claimed in claim 1, wherein
step a) further comprises checking the electrical control unit for compatibility with the second firmware version by way of the script, and
wherein step b) further comprises, in a case where the electrical control unit is compatible with the second firmware version, changing over from the first firmware version to the second firmware version in the electrical control unit.

7. The method as claimed in claim 1, wherein
the electrical control unit is a frequency converter, a servo converter, a motion controller or a visu controller.

8. An apparatus, comprising:
an electrical control unit for a drive system, the electrical control unit being configured to execute an existing application program for operating the drive system, wherein a different first firmware version is in operation in the electrical control unit, wherein
the electrical control unit is operatively configured to execute a changing over to a second firmware version by:
- a) checking the existing application program for compatibility with the second firmware version by way of a script; and
- b) in a case where the existing application program is compatible with the second firmware version, changing over from the different first firmware version to the second firmware version in the electrical control unit, wherein the second firmware version then occupies an intermediate position between hardware of the electrical control unit and the existing application program, wherein the electrical control unit is further operatively configured to:

change over to the script, in one script version that has been assigned to the second firmware version, from a different script in a different script version that has been assigned to the first firmware version, and wherein the checking is carried out by use of the script in the one script version, wherein the script is in a script version corresponding to the second firmware version or higher, and wherein the script is designed to read out the application program itself, at least partially, and on the basis thereof to check the compatibility.

9. A drive system, comprising:
an electrical control unit for a drive system, the electrical control unit being configured to execute an existing application program for operating the drive system, wherein a different first firmware version is in operation in the electrical control unit; and
an electric motor actuator, the electrical control unit being assigned to the actuator for control purposes, wherein
the electrical control unit is operatively configured to execute a changing over to a second firmware version by:
- a) checking the existing application program for compatibility with the second firmware version by way of a script; and
- b) in a case where the existing application program is compatible with the second firmware version, changing over from the first firmware version to the second firmware version in the electrical control unit, wherein the second firmware version then occupies an intermediate position between hardware of the electrical control unit and the existing application program, wherein the electrical control unit is further operatively configured to:

change over to the script, in one script version that has been assigned to the second firmware version, from a different script in a different script version that has been assigned to the first firmware version, and wherein the checking is carried out by use of the script in the one script version, wherein the script is in a script version corresponding to the second firmware version or higher, and wherein the script is designed to read out the application program itself, at least partially, and on the basis thereof to check the compatibility.

* * * * *